United States Patent [19]
Brantley

[11] Patent Number: 5,319,922
[45] Date of Patent: Jun. 14, 1994

[54] AIRCRAFT GAS TURBINE ENGINE BACKBONE DEFLECTION CONTROL

[75] Inventor: James W. Brantley, Fairfield, Ohio

[73] Assignee: General Electric Company, Cincinnati, Ohio

[21] Appl. No.: 985,776

[22] Filed: Dec. 4, 1992

[51] Int. Cl.[5] ............................................. F02C 7/20
[52] U.S. Cl. .................................. 60/39.31; 60/39.32; 244/54
[58] Field of Search ........................... 60/39.31, 39.32; 244/53 R, 54

[56] References Cited

U.S. PATENT DOCUMENTS

| | | |
|---|---|---|
| 4,022,018 | 5/1977 | Tuten et al. |
| 4,266,741 | 5/1981 | Murphy . |
| 4,428,189 | 1/1984 | Greenberg et al. |
| 4,471,609 | 9/1984 | Porter et al. |
| 4,603,821 | 8/1986 | White . |

FOREIGN PATENT DOCUMENTS 1346600  2/1974  United Kingdom ............... 60/39.32

Primary Examiner—Richard A. Bertsch
Assistant Examiner—W. J. Wicker
Attorney, Agent, or Firm—Jerome C. Squillaro; John R. Rafter

[57] ABSTRACT

A gas turbine engine backbone deflection control apparatus to counter the effects of backbone bending due to gust, thrust. and maneuver loads by introducing a controlled backbone counter-bending moment by applying controlled tensioning forces only between axially spaced apart frames connected by the backbone. One embodiment of the invention, for a high bypass ratio turbofan engine, provides a hydraulically powered actuator to produce tensioning forces in cables connected between a fan frame and a turbine frame and the actuator is controlled by the engines digital electronic control system using input signals generated by inlet moment load sensors and/or blade tip clearance sensors.

14 Claims, 3 Drawing Sheets

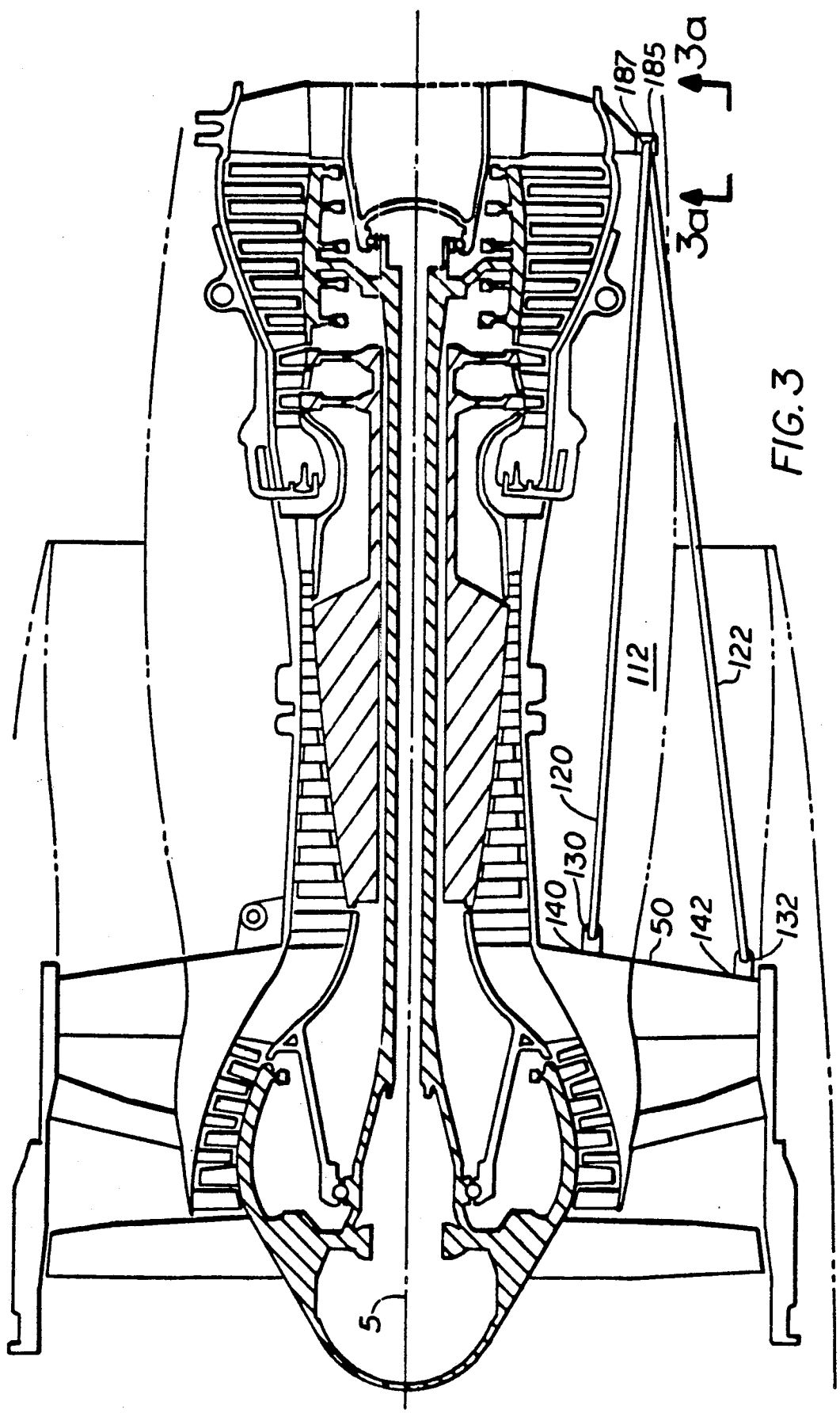

AIRCRAFT GAS TURBINE ENGINE BACKBONE DEFLECTION CONTROL

BACKGROUND OF THE INVENTION

1. Field of the Invention

This invention relates to gas turbine engine apparatus for minimizing engine case deflection under gust and thrust loads and particularly to means for controlling the engine backbone bending.

The concepts were developed specifically for high bypass ratio, ducted fan engines, but have broader applicability to low bypass ratio and turbojet engines as well.

1. Description of Related Art

A principal type of modern aircraft gas turbine engines in usage today are of the turbofan type. A portion of the working medium gases is directed from the engine inlet through the compression, combustion, and turbine sections of the engine core. The remaining portion of the working medium gases is directed through the fan section, around the engine core, and discharged directly to the atmosphere to produce thrust. The diameter of the engine at the fan stages is typically significantly larger than the core engine diameter, on the order of two to one and larger for high bypass ratio engines of the eighty thousand pound thrust class.

Each engine is supported by an aircraft structure, for example, on a pylon extending downwardly beneath the wing. The engine is typically mounted and secured to the aircraft in two planes normal to the engine centerline, one towards the forward end of the engine, usually just rearward of the fan section and a second toward the aft end of the engine, typically in the turbine section. The engine is mounted by its static structure which supports the rotating components generally referred to as rotors. The engine static structure generally has substructures including a forward frame and a aft frame connected by an engine casing often referred to as a backbone. Forward and aft frames having radially extending structural struts which typically support the engine bearings which in turn rotatably support the rotors. Typically a dual rotor engine has a forward fan frame and a rear turbine frame that support the main rotor bearings wherein the fan frame supports a thrust bearing and the rear turbine supports a roller bearing.

Maintaining the engine backbone concentrically about the engine rotor is of obvious criticality, and a constant objective of gas turbine scientists and engineers. Prior art generally disclose case stiffening methods to reinforce the frame. Among the ideas disclosed in the prior art is using the annular cowl structure to reinforce or generally add support to the engine backbone. Many of these ideas add weight and cost to the engine and are not very effective when used with today's low weight metallic or composite cowls. Furthermore the prior art designs are not capable or have limited capability to respond to varying flight conditions which cause correspondingly varying degrees of backbone deflection.

Backbone deflection due to axial and vertical loads is additive because both loads cause a deflected shape wherein the engine casing or backbone structure between the forward and aft mounts is deflected downward relative to the undisturbed engine centerline. High engine power aircraft climb can cause predictable yet varying backbone deflection while wind gusts acting on the nacelle may cause unpredictable and varying backbone deflection which is additive.

To maximize gas turbine engine performance and minimize specific fuel consumption it is desirable to have the engine static structure remains straight and parallel to the engine rotor centerline under all operating conditions. Typically this is achieved through proper design of the engine static structure, engine mounts and engine rotors. It is highly desirable to maintain close clearances between rotating and static elements such between the engine rotor blades and engine casings because this clearance has a significant effect on engine performance and specific fuel consumption. An increase in turbine blade tip clearance allows more of the working fluid to bypass the turbine blades without useful work being extracted. Compressor efficiency is reduced in the compressor section as compressor blade tip clearance increases. Overall engine cyclic efficiency is reduced as labyrinth seal clearances increase. Bending of the engine static structure increases these clearances through abrasive wear between the engine rotating hardware and the engine casing supported stationary hardware.

As the thrust load developed by modern turbofan engines has increased, so has the magnitude of the reaction loads and bending moment. The resultant engine static structure deflection causes increased rubbing between the rotating elements and the adjacent stationary elements. This abrasive wear results in an adverse impact on engine performance and specific fuel consumption, and necessitates more frequent engine maintenance and overhaul. Repair and replacement of rotor blades is one of the highest operating costs for an aircraft gas turbine engine.

Increasing fuel costs and demands for improved durability accentuate the need for low weight designs and systems for minimizing backbone deflection from the engine centerline axis under varying engine operating conditions.

SUMMARY OF THE INVENTION

According to the present invention the backbone deflection of an aircraft gas turbine engine due to the effect of gust and thrust loads and the resultant backbone bending moment is reduced or eliminated by introducing a controlled backbone counter-bending moment by applying controlled tensioning forces only between axially spaced apart frames connected by the backbone.

According to one embodiment of the invention for a high bypass turbofan engine, the controlled backbone counter-bending moment is produced by a controlled variable tensioning only means between a forward and aft frame, wherein the frames are connected by an engine casing commonly referred to as a backbone. One embodiment provides that the controlled variable tensioning means uses mechanical tensioning elements are mounted to the frames at points radially outward of the engine casing. More particular embodiments provides for both active and passive tension actuation means.

The preferred embodiment provides three circumferentially spaced controlled variable tensioning only means around the casing between a forward located fan frame and aft located turbine frame of a turbofan engine. The controlled variable tensioning only means is an active one that uses a preferably hydraulically powered actuator to provide a force at one end of a pivotable lever which intermediately pivots about a forward end of an aft cable or other tensile structure member that is connected to a point on the turbine frame. The other end of the lever is attached to the aft end of a forward cable or other tensile structure member that is connected at its forward end to the fan frame as is the actuator and both are pivotably connected to the fan frame generally parallel to the forward cable. The invention preferably provides for three tensioning means with the first placed at the engine top centerline on the casing (0°) and the other two spaced an angular distance B apart from and to either side of the engine bottom centerline (180°), the angular distance B preferably being about 30°. Control of the tensioning forces is provided by an engine control preferably a digital electronic control such as a FADEC (full authority digital electronic control) using input signals generated by inlet moment load sensors and/or blade tip clearance sensors as control parameters indicative of backbone bending.

Another embodiment provides a passive controlled variable tensioning only means that uses two cables pivotably connected at their forward ends to two radially spaced apart points on the fan frame and at their aft ends to two corresponding ends of a pivotable lever which is pivotable about a lever pivot point which is pivotably connected to a point on the turbine frame. The two lever arms between the ends of the lever and the pivot point are preferably of unequal length and may be preset to provide a controlled amount of tension forces and resultant backbone counter-bending moment based on a predetermined backbone bending moment and case deflection mission.

ADVANTAGES

A principal advantage of the present invention is the ability to control concentricity of the engine case about the engine axis over a broad range of operating conditions that tend to bend the engine backbone. Engine case deflection as a result of gust and thrust loads may be reduced or eliminated over a broad and varying flight conditions and mission. This increases fuel economy and engine component durability due to greatly reduced case deflection all along the rotor of the engine.

The foregoing, and other features and advantages of the present invention, will become more apparent in the light of the following description and accompanying drawing.

BRIEF DESCRIPTION OF THE DRAWINGS

The foregoing aspects and other features of the invention are explained in the following description, taken in connection with the accompanying drawings where:

FIG. 3 is a schematic cross-sectional view of the engine depicted in FIG. 1 with a passive controlled variable tensioning means in accordance with one embodiment of the present invention.

DETAILED DESCRIPTION OF THE INVENTION

Figure 1:
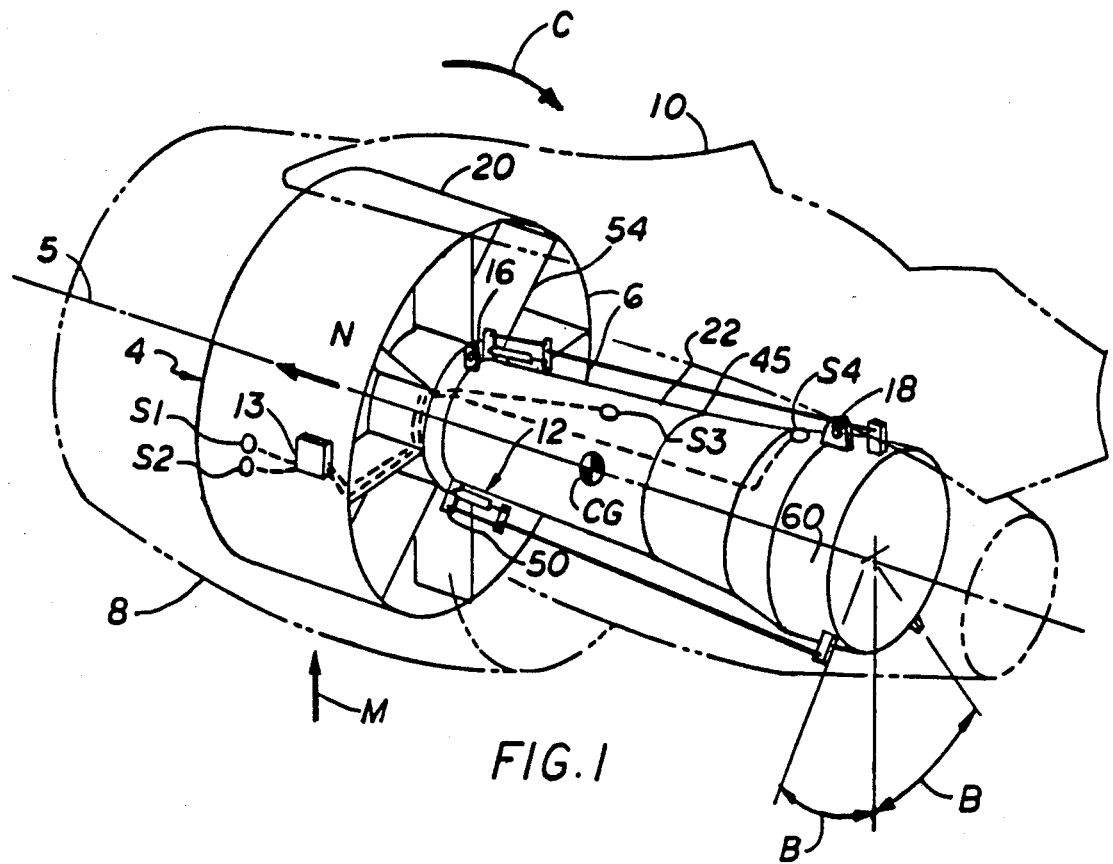
FIG. 1 is a schematic perspective view of a typical gas turbine engine including a controlled variable tensioning means for introducing a controlled backbone counter-bending moment to the engine's backbone in accordance with the present invention.

Illustrated in FIG. 1 is an aircraft gas turbine engine 4, of the turbofan type, mounted within a nacelle 8 (shown by a phantomed line) and mounted to an aircraft (not shown) by mounting structure referred to as a pylon 10 (shown by a phantomed line) and employing the concepts of the present invention. The engine 4 is generally disposed about an undisturbed engine centerline 5 and has frame structure including a forward or fan frame 50 connected by a backbone 45, which is typically part of the engine casing 6, to an aft or turbine frame 60. The engine 4 is attached to the pylon 10, which typically extends downwardly from the aircraft wing, at a forward mounting means 16 on the fan frame 50 and at a rearward mounting means 18 on the turbine frame 60.

The engine is illustrated in the approximate attitude of level cruise and ground taxi conditions with the engine centerline 5 being substantially horizontal. As the aircraft leaves the runway and takes a climb condition attitude the centerline 5 becomes canted to the direction of approaching airflow. Aircraft maneuvers adds mass loading W acting essentially through the engine's center of gravity CG and aerodynamic loads from the nacelle may also add to the gust loads. As a result gust and other aerodynamically induced loading M and/or maneuvering loads W, shown as directed radially inward at 180° from the top center but may be from other angular directions in a full range of 0°–360°, tends to pivot the engine in a clockwise direction C as illustrated, about the forward mounting means 16. The condition is particularly severe in engines with large diameter fan sections. Concurrently, thrust loads generated within the engine and acting along the engine's centerline 5 in the direction N further tend to cause the engine to pivot in the clockwise direction C as illustrated, about the forward mounting means. Rotation of the engine about the forward mount 16 is restrained by the rear mounting means 18 with the result that bending moments are induced and dissipated within the engine casing 6 and related structure and the casing is deflected from its undisturbed position which is generally concentric about the undisturbed engine centerline 5.

According to one embodiment of the present invention at least one, and preferably three, controlled variable tensioning only means generally illustrated at 12 are provided between a forward frame, preferably a fan frame 50, and an aft frame, preferably a turbine frame 60. The three controlled variable tensioning only means 12 are placed at 0°, 150°, and 210° from a plane passing through the forward mounting means 16 and the rearward mounting means 18. This provides a good and economical degree of backbone deflection control over a wide range of the aircraft engine operating mission. The controlled variable tensioning only means 12 is preferably controlled by an engine control 13 preferably a digital electronic control such as a FADEC (full authority digital electronic control) using input signals generated by inlet moment load sensors S1 and/or blade tip clearance sensors, such as a fan blade tip clearance sensor S2 or a compressor blade tip clearance sensor S3 or a turbine blade tip clearance sensor S4, as control parameters indicative of backbone bending.

Figure 2:
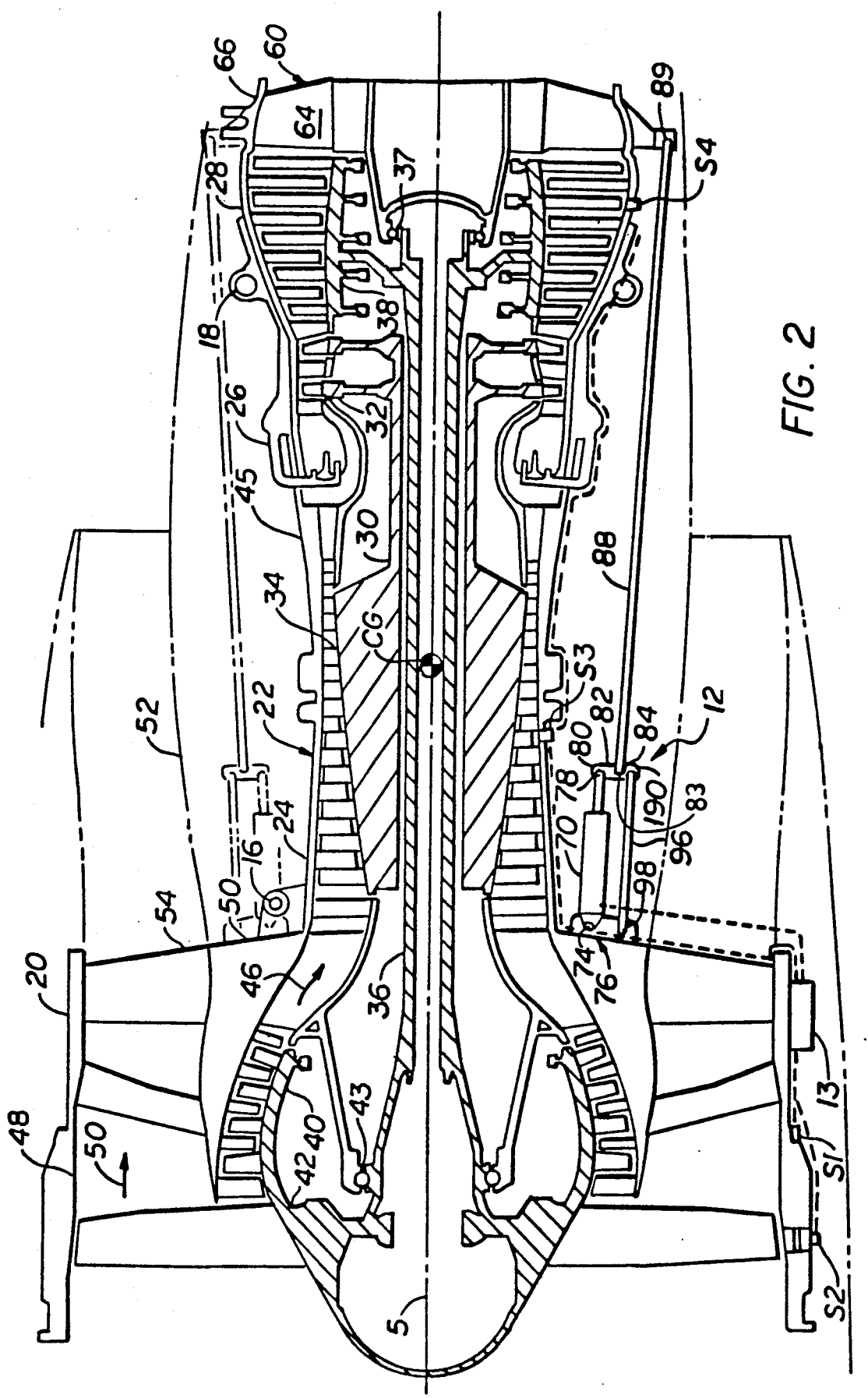
FIG. 2 is a schematic cross-sectional view of the engine depicted in FIG. 1 with an active controlled variable tensioning means in accordance with one embodiment of the present invention.

FIG. 2 illustrates in greater detail the engine 4 which is principally constructed with a fan section 20 and a core section 22 including a compression section 24, a combustion section 26 and a turbine section 28. The engine is of the two spool type having a high speed rotor 30 joining a high pressure turbine section 32 to a high pressure compression section 34 and a low speed rotor 36 joining a low pressure turbine section 38 to a booster compressor 40 and a fan stage 42. The low speed rotor 36 is supported axially and radially from the engine frame structure by a forward thrust bearing 43 mounted in the fan frame 50 and radially by an aft rotor bearing 37 mounted in the turbine frame 60. The high speed rotor 30 is disposed concentrically about the low speed rotor 36 by bearings not shown herein. The forward thrust bearing 43 is supported within the fan frame 50 that includes fan struts 54 that extend radially outward to a fan case 48 which is also part of the fan frame. The fan frame 50 is connected to a core engine casing or backbone 45 which circumscribes a core stream 46 of the engine and a fan case 48 circumscribes a fan stream 50 of the engine. The aft rotor bearing 37 is supported within the turbine frame 60, which is connected to the backbone 45, that includes turbine frame struts 64 that extend generally radially outward to a turbine case 66 which is also considered part of the turbine frame.

Further referring to FIG. 2, the controlled variable tensioning means 12, shown in FIG. 1, includes a preferably hydraulically powered actuator 70 pivotably mounted at its forward end 74 to a fan frame mounting pad 76, attached to the fan frame 50, and at its aft end 78 to a first end 80 of a pivotable lever 82. The pivotable lever 82 is intermediately pivotable at a lever pivot point 83 that is pivotably connected to a forward end 84 of an aft cable 88 that is in turn connected pivotably to an aft frame attachment point 89 on the turbine frame 60. A second end 90 of the lever 82 is pivotably attached to an aft end 92 of a forward cable 96 and the forward cable 96 is connected at its forward end 98 to the fan frame mounting pad 76 which is mounted to the fan frame 50.

Control of the tensioning forces is provided by the digital electronic control 13 using input signals generated by inlet moment load sensors S1 and/or blade tip clearance sensors S2, S3 and/or S4 as control parameters as described above. The engine control 13 may employ control logic which uses one or more of alternative well known engine operating parameters including the speeds of the high pressure rotor 30 or of the low pressure rotor 36 or the fan frame inlet load and/or moment which may be measured directly and indirectly, using strain gauges devices for example (not shown), in well known and conventional methods. The engine control 13 is operably connected to send a control signal to actuator 70 to adjust tensile forces in forward cable 96 and the aft cable 88 through the pivotable lever 82. This produces the backbone counter-bending moment to counter the case deflection in the general plane that the engine centerline and cables 88 and 96 lie in. It is preferable to have three controlled variable tensioning only means 12 in planes that are spaced at 0°, 150°, and 210° from a plane passing through the forward mounting means 16 and the rearward mounting means 18 but other configurations are contemplated by the present invention including having only one at 180° which may give the most amount of performance for the cost and weight associated with the invention.

Another embodiment is illustrated in FIG. 3 which provides a passive controlled variable tensioning only means 112 that uses a radially inner cable 120 and a radially outer cable 122 that are pivotably connected at their forward ends 130 and 132 respectively to radially spaced apart inner and outer points 140 and 142 respectively on the fan frame 50. The radially inner cable 120 and the radially outer cable 122 are pivotably connected at their respective aft ends 178 and 192 to an aft frame point 185 on the turbine frame 60 by way of a lever assembly 187.

Figure 3A:
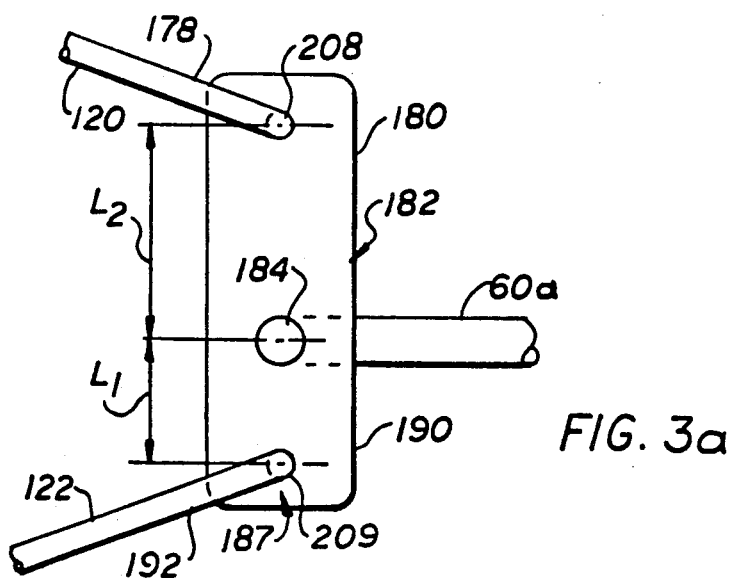
FIG. 3A is an enlarged view of the lever assembly in FIG. 3.

FIG. 3A illustrates in more detail the lever assembly 187 as being mounted on a turbine frame mounting pad 60a attached to the turbine frame 60 of FIG. 3. The radially inner cable aft end 178 is pivotably connected to a first end 180 of an aft pivotable lever 182 of the lever assembly 187 at a first aft lever point 208 on the aft pivotable lever 182. The radially outer cable aft end 192 is pivotably connected to a second end 190 of the aft pivotable lever 182 at a second aft lever point 209 on the aft pivotable lever 182. The aft pivotable lever 182 is intermediately pivotable at a lever pivot point 184 that is a first lever arm distance L1 from the first aft lever point 208 and a second lever arm distance L2 from the second aft lever point 209 on the lever.

Control of the backbone counter-bending moment to counter the case deflection is effectuated by setting a predetermined ratio L1/L2 for the aft pivotable lever 182. The radially outer cable 122 is subject to a greater amount of axially forward movement than the radially inner cable 120 when case deflection due to gusts and thrust loads occurs over the aircraft's mission. This difference is due to at least two things. The first is the tapering stiffness of the fan frame struts 54 (in FIG. 1) and the second is the different radial locations of the cables as the fan case rotates axially with respect to the engine centerline 5. This differential radial location of the cables produces greater tensile forces in the radially outer cable 122 than in the radially inner cable 120. The total amount of tensile force to produce the backbone counter-bending moment is then proportionally set and between the two cables by the ratio of L1/L2 and controlled over the aircraft mission.

While the preferred embodiment of the invention has been described fully in order to explain its principles, it is understood that various modifications or alterations may be made to the preferred embodiment without departing from the scope of the invention as set forth in the appended claims.

I claim:

1. A backbone counter-bending control apparatus for an aircraft gas turbine engine, said apparatus comprising:
    a backbone counter-bending moment means for applying tensioning forces only throughout the operating range of the aircraft gas turbine engine between axially spaced apart forward and aft frames that are connected by a backbone structure and a control means for controlling the amount of tensioning forces produced by aid backbone counter-bending moment means.

2. An apparatus as claimed in claim 1 wherein said backbone counter-bending moment means further comprises a passive actuating means.

3. An apparatus as claimed in claim 2 wherein said passive actuating means further comprises:
    a radially inner cable pivotably connected at one of its ends at a radially inner point on one of said frames and at its other end to a first lever end point on a first end of a pivotable lever, said pivotable lever intermediately pivotable at a lever pivot point at which said lever is pivotably connected to said other of said frames, a radially outer cable pivotably connected at one of its ends at a radially outer point on said one of said frames at a point radially outward of said radially inner point, said radially outer cable pivotably connected at its other end to a second lever end point on a second end of said lever.

4. An apparatus as claimed in claim 3 wherein said passive actuating means further comprises:

a first lever arm distance L1 between said first lever end point and said lever pivot point, a second lever arm distance L2 between said second lever end point and said lever pivot point, and control of the backbone counter-bending moment to counter the case deflection is effectuated by providing a ratio L1/L2 corresponding to a predetermined case deflection flight mission.

5. An apparatus as claimed in claim 1 wherein said backbone counter-bending moment means further comprises a powered actuator.

6. An apparatus as claimed in claim 5 wherein said actuator is powered by one of the following group: hydraulic power, electric power, and pneumatic power.

7. An apparatus as claimed in claim 5 wherein said control means is an engine control operably connected to a sensor that is operable to generate at least one control input signal for said engine control wherein said input signal is indicative of backbone bending.

8. An apparatus as claimed in claim 7 wherein said input signal is at least one of a plurality of backbone bending indicative signals, said plurality of backbone bending signals including one that measures inlet moment load and others that measure blade tip clearances.

9. An apparatus as claimed in claim 8 further comprising:

said powered actuator pivotably mounted at one of its ends to one of said frames and at its other end to a first end of a pivotable lever, said pivotable lever intermediately pivotable at a lever pivot point at which said lever is pivotably connected to one end of a first cable, said first cable pivotably connected at its other end to other of said frames, a second end of said lever is pivotably attached to one end of a second cable, and said second cable is pivotably connected at its other end to said one of said frames.

10. An apparatus as claimed in claim 9 wherein said axially spaced apart forward and aft frames comprise a fan frame and turbine frame respectively.

11. An apparatus as claimed in claim 10 wherein said control means is an aircraft gas turbine engine electronic control.

12. An apparatus as claimed in claim 11 wherein said powered actuator is hydraulically powered.

13. A backbone counter-bending control apparatus for an aircraft gas turbine engine, said apparatus comprising:

a backbone counter-bending moment means for applying tensioning forces only between axially spaced apart forward and art frames that are connected by a backbone structure and a control means for controlling the amount of tensioning forces produced by said backbone counter-bending moment means, wherein said backbone counter-bending moment means further comprises a powered actuator.

14. A backbone counter-bending control apparatus for an aircraft gas turbine engine, said apparatus comprising:

a backbone counter-bending moment means for applying tensioning forces only between axially spaced apart forward and aft frames that are connected by a backbone structure and a control means for controlling the amount of tensioning forces produced by said backbone counter-bending moment means, wherein said backbone counter-bending moment means further comprises a passive actuating means, wherein said passive actuating means further comprises:

a radially inner cable pivotably connected at one of its ends at a radially inner point on one of said frames and at its other end to a first lever end point on a first end of a pivotable lever, said pivotable lever intermediately pivotable at a lever pivot point at which said lever is pivotably connected to said other of said frames, a radially outer cable pivotably connected at one of its ends at a radially outer point on said one of said frames at a point radially outward of said radially inner point, said radially outer cable pivotably connected at its other end to a second lever end point on a second end of said lever.

* * * * *